(12) United States Patent
Hemer et al.

(10) Patent No.: US 9,816,433 B2
(45) Date of Patent: Nov. 14, 2017

(54) EXHAUST-GAS TURBOCHARGER

(75) Inventors: Josef-Hans Hemer, Worms (DE); Uwe Schmitt, Moerlenbach (DE); Oliver Schumnig, Gundersheim (DE)

(73) Assignee: BorgWarner Inc., Auburn Hills, MI (US)

(*) Notice: Subject to any disclaimer, the term of this patent is extended or adjusted under 35 U.S.C. 154(b) by 737 days.

(21) Appl. No.: 14/115,501

(22) PCT Filed: Apr. 27, 2012

(86) PCT No.: PCT/US2012/035433
§ 371 (c)(1),
(2), (4) Date: Nov. 4, 2013

(87) PCT Pub. No.: WO2012/154424
PCT Pub. Date: Nov. 15, 2012

(65) Prior Publication Data
US 2014/0064994 A1    Mar. 6, 2014

(30) Foreign Application Priority Data
May 10, 2011  (DE) .................. 10 2011 101 057

(51) Int. Cl.
*F01D 25/14* (2006.01)
*F02B 37/12* (2006.01)
*F01D 25/16* (2006.01)

(52) U.S. Cl.
CPC .............. *F02B 37/12* (2013.01); *F01D 25/14* (2013.01); *F01D 25/145* (2013.01); *F01D 25/16* (2013.01); *F05D 2220/40* (2013.01); *F05D 2260/231* (2013.01)

(58) Field of Classification Search
CPC ........ F01D 25/145; F01D 25/14; F01D 25/16; F05D 2220/40; F05D 2260/231; F02C 6/12; F02B 37/12
See application file for complete search history.

(56) References Cited

U.S. PATENT DOCUMENTS

| | | | | |
|---|---|---|---|---|
| 1,679,324 A | * | 7/1928 | Murray ................ | F16K 41/023 251/223 |
| 4,188,673 A | * | 2/1980 | Carter .................... | E04H 4/169 134/167 R |
| 4,482,304 A | * | 11/1984 | Brobeck ................ | F01D 25/04 415/119 |
| 4,586,878 A | * | 5/1986 | Witchger ................ | F02C 6/12 415/166 |
| 4,798,523 A | * | 1/1989 | Glaser .................... | F01D 25/16 184/6.16 |
| H974 H | * | 11/1991 | Mizobuchi .............. | B22F 3/24 29/898.041 |
| 2005/0257522 A1 | * | 11/2005 | Fremerey .............. | F01D 25/145 60/605.3 |

(Continued)

*Primary Examiner* — Peter J Bertheaud
*Assistant Examiner* — Dnyanesh Kasture
(74) *Attorney, Agent, or Firm* — Eric L. Doyle; Stephan A. Pendorf; Patent Central LLC

(57) ABSTRACT

An exhaust-gas turbocharger (1) having a turbine (2); a compressor (3); and a bearing housing (4) which is arranged between the turbine (2) and the compressor (3) and a compressor-side flange (5) of which adjoins the compressor (3). A heat throttle (6, 6') is arranged in the compressor-side flange (5) of the bearing housing (4).

17 Claims, 3 Drawing Sheets

(56) References Cited

U.S. PATENT DOCUMENTS

| | | | | |
|---|---|---|---|---|
| 2007/0036664 | A1* | 2/2007 | Shibui | F01D 25/125 417/407 |
| 2007/0256412 | A1* | 11/2007 | Martin | F01D 25/24 60/605.1 |
| 2010/0284824 | A1* | 11/2010 | Hippen | F01M 11/02 417/44.1 |
| 2010/0307151 | A1* | 12/2010 | French | F01D 25/002 60/605.1 |
| 2012/0156013 | A1* | 6/2012 | Binek | B64D 13/06 415/177 |
| 2012/0209111 | A1* | 8/2012 | Cowan | A61M 5/007 600/432 |

\* cited by examiner

EXHAUST-GAS TURBOCHARGER

BACKGROUND OF THE INVENTION

Field of the Invention

The invention relates to an exhaust-gas turbocharger.

Description of the Related Art

If the bearing housing of an exhaust-gas turbocharger of said type has a compressor-side flange or an integrated rear wall which directly adjoins the housing of the compressor, a flow of heat from the turbine side to the compressor side occurs, which leads to additional heating of the compressor, in particular at low rotational speeds/loads.

It is therefore an object of the present invention to provide an exhaust-gas turbocharger of the type specified in the preamble of claim 1 which permits a reduction in the transfer of heat from the turbine side to the compressor side.

BRIEF SUMMARY OF THE INVENTION

Through the provision of a heat throttle in the compressor-side flange, it is possible to thermally decouple the bearing housing from the compressor or from the compressor housing, and thereby reduce the heat conduction from the turbine side in the direction of the compressor.

In this way, the additional heating of the compressor as explained above is eliminated, resulting in a considerable improvement in compressor efficiency.

The subclaims relate to advantageous refinements of the invention.

BRIEF DESCRIPTION OF THE SEVERAL VIEWS OF THE DRAWINGS

Further details, features and advantages of the invention will emerge from the following description of exemplary embodiments on the basis of the drawings, in which.

DETAILED DESCRIPTION OF THE INVENTION

Figure 1:
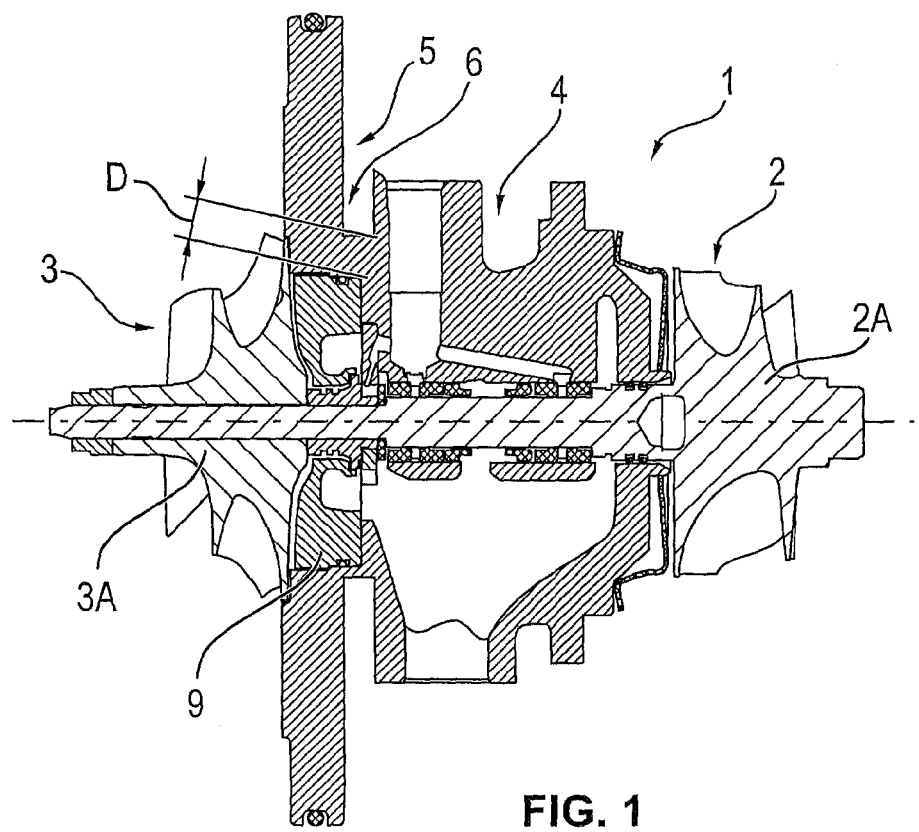
FIG. 1 shows a schematically simplified illustration of a first embodiment of the exhaust-gas turbocharger according to the invention.

FIGS. 1, 2, 4 and 5 show four embodiments of an exhaust-gas turbocharger 1 according to the invention, wherein these each have a turbine 2 and a compressor 3. Here, the turbine 2 is represented by the turbine wheel 2A, while the compressor is represented by the compressor wheel 3A. To simplify the illustration, however, the turbine housing and the compressor housing are not shown in FIGS. 1, 2, 4 and 5, though these are self-evidently provided in a practical embodiment of an exhaust-gas turbocharger. This also applies to all other components of such exhaust-gas turbochargers, which are however not described in detail below because they are not necessary for explaining the principles of the present invention.

The exhaust-gas turbochargers 1 according to the embodiments of FIGS. 1, 2, 4 and 5 each have a bearing housing 4 which, in each of the illustrated embodiments, is provided with a compressor-side integrated flange or an integrated rear wall 5 which, in the fully assembled state of the exhaust-gas turbocharger 1, adjoins in each case the compressor housing (not illustrated in the figures) of the compressor 3.

To permit thermal decoupling between the turbine side and the compressor side, in the abovementioned embodiments, the compressor-side flange 5 is provided in each case with a heat throttle 6 or 6'.

In the embodiment according to FIG. 1, said heat throttle 6 is formed as an external groove in the flange 5, that is to say as a groove 6 which opens into the outer region, as can be seen in detail from FIG. 1. Here, the groove 6 is preferably formed as a groove which encircles 360° around the flange 5. Said groove 6 yields the desired thermal decoupling, wherein the narrowest cross section which constitutes the throttling point is denoted by the reference symbol D.

The external groove or the undercut 6 may be produced by casting or mechanical machining of the flange 5.

Figure 2:
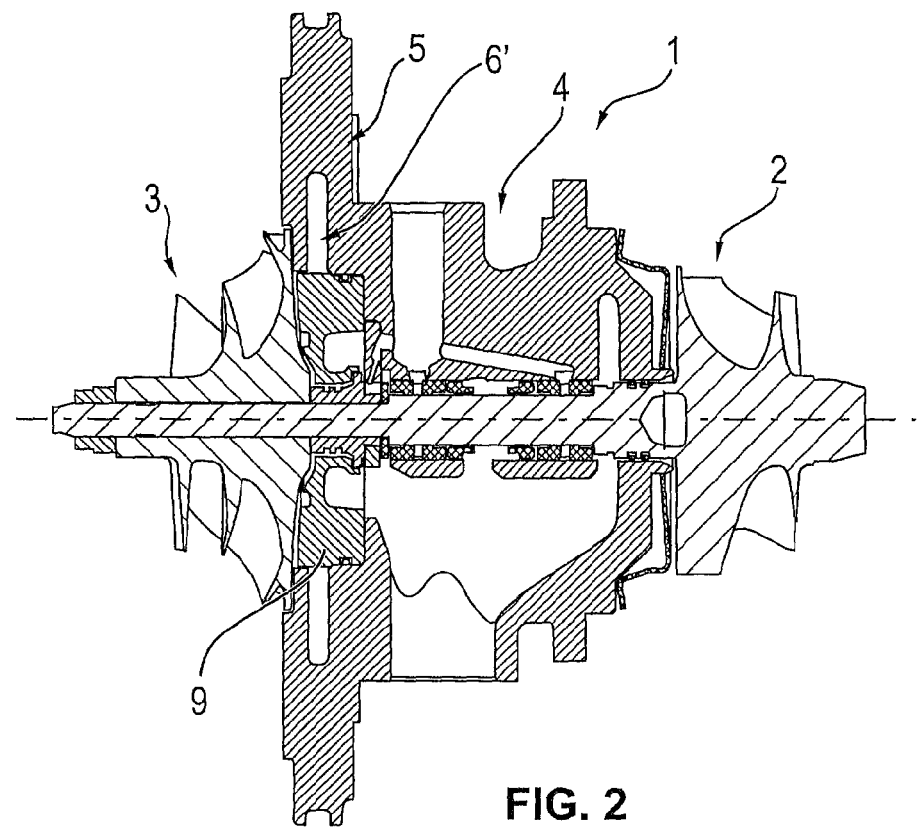
FIG. 2 shows an illustration, corresponding to FIG. 1, of a second embodiment.
Figure 3:
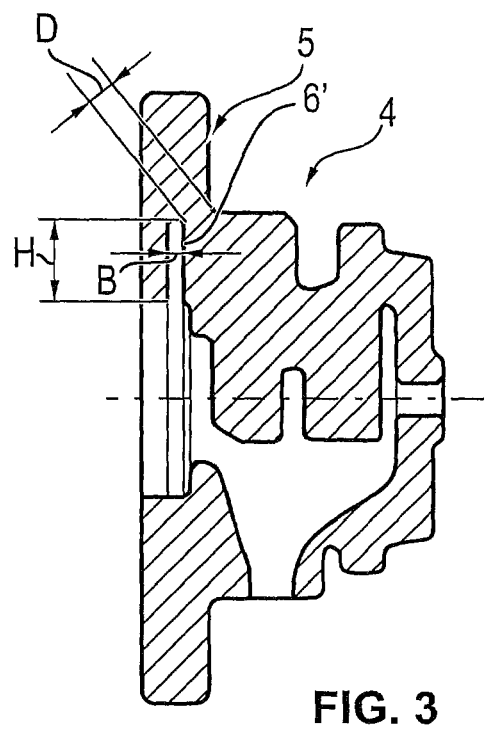
FIG. 3 shows a schematically slightly simplified illustration of a bearing housing according to the invention.
Figure 4:
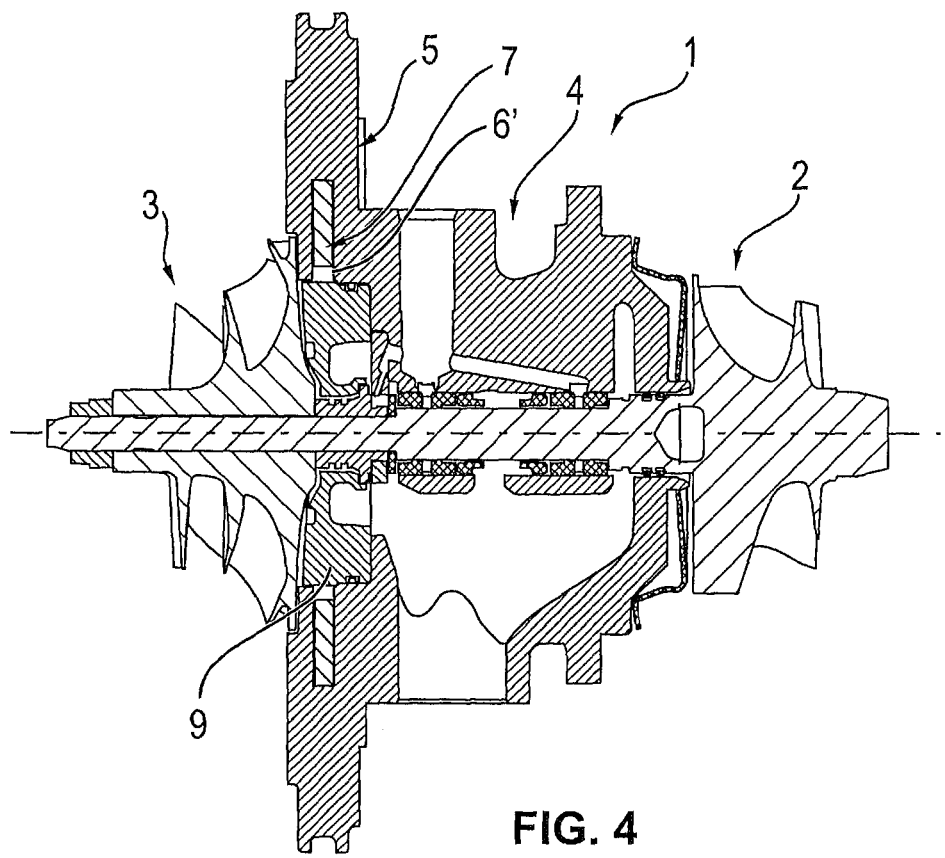
FIG. 4 shows an illustration, corresponding to FIGS. 1 and 2, of a third embodiment of the exhaust-gas turbocharger according to the invention.
Figure 5:
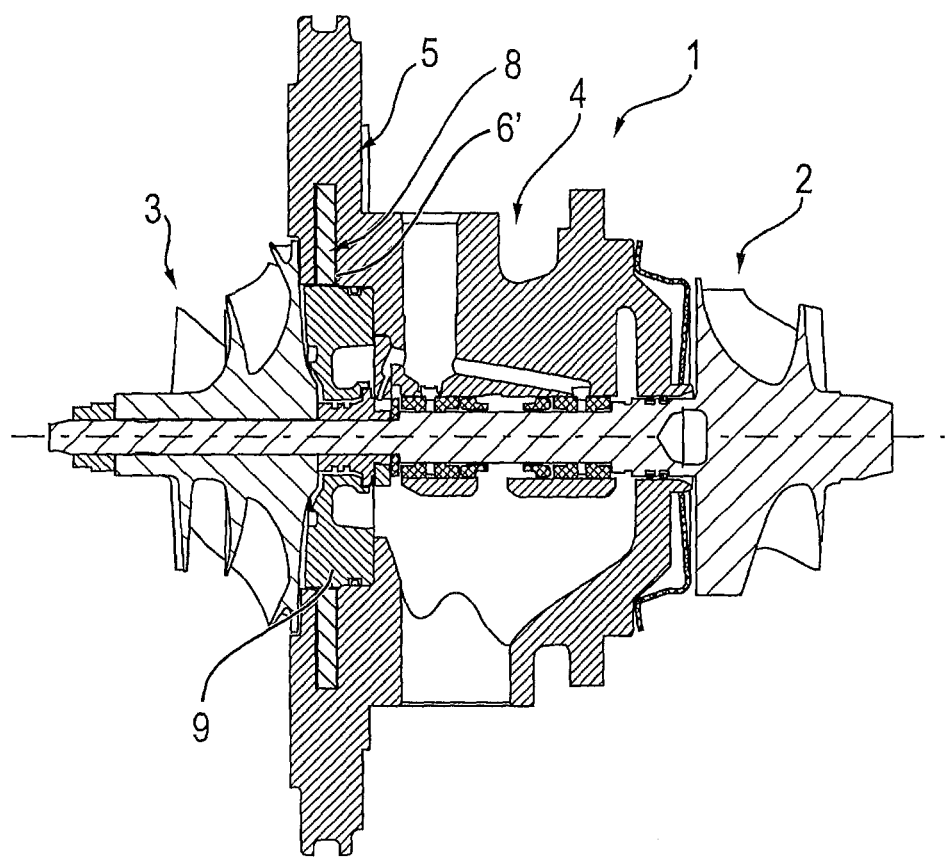
FIG. 5 shows an illustration, corresponding to FIGS. 1, 2 and 4, of a fourth embodiment of the exhaust-gas turbocharger according to the invention.

In the embodiments according to FIGS. 2, 4 and 5, a heat throttle 6' in the form of an internal groove is provided, said internal groove again preferably being formed as a 360° encircling groove, which, however, as is shown by the illustration of the alternative embodiments of the bearing housing 4 in FIG. 3, is not imperatively necessary but is preferable.

The internal groove 6' also yields the desired thermal decoupling which leads to the advantages, explained in the introduction, of the exhaust-gas turbocharger 1 according to the invention.

In the embodiment according to FIG. 4, a heat insulation element 7 is arranged in the internal groove 6', which heat insulation element does not completely fill the groove 6'.

In the embodiment according to FIG. 5, there is likewise a heat insulation element 8 arranged in the groove 6', but in this case the heat insulation element 8 completely fills the groove, that is to say extends as far as a housing cover 9 of the bearing housing 4, as can be seen in detail from FIG. 5.

The heat insulation element 7 or 8 may be produced as a disk composed of heat-insulating material, for example as a ceramic disk.

The internal grooves 6' may also be produced either mechanically or during the course of the casting of the bearing housing 4.

It is also possible for the heat insulation element 7, 8 to be placed or cast into the groove 6'.

As explained above, FIG. 3 illustrates a groove 6' which is an only partially encircling groove. The reference symbol D again denotes the narrowest cross section. Also labeled in FIG. 3 are the height H and the width B of the groove 6', which are preferably in a ratio H/B>2.5. The narrowest cross section D lies in a range from approximately 2 to 3 mm.

Said ratio H/B is self-evidently also possible if the groove 6' is formed as a 360° encircling groove.

In addition to the above written disclosure of the invention, reference is hereby explicitly made to the diagrammatic illustration thereof in FIGS. 1 to 5.

LIST OF REFERENCE SYMBOLS

1 Exhaust-gas turbocharger
2 Turbine
3 Compressor

4 Bearing housing
5 Compressor-side flange/integrated rear wall
6, 6' Heat throttle (external or internal groove)
7, 8 Heat insulation element
9 Bearing housing cover
D Narrowest cross section/throttle point
H Height of the groove
B Width of the groove

The invention claimed is:

1. An exhaust-gas turbocharger (1) comprising
a turbine (2);
a compressor (3); and
a bearing housing (4) which is arranged between the turbine (2) and the compressor (3) and includes a compressor-side flange (5) which adjoins the compressor (3), wherein
a thermal decoupling heat throttle (6, 6') is arranged in the compressor-side flange (5) of the bearing housing (4), which reduces the heat conducting path in the bearing housing to at most 3 mm at it's narrowest cross-section,
the heat throttle is an external groove (6) defined between a first groove wall in the bearing housing having a height and a second groove wall in the bearing housing having a height, wherein the height (H) of the groove is defined as the smallest height of the groove wall in the bearing housing, and
a ratio of height (H) to width (B) of the groove (6') is >2.5.

2. The exhaust-gas turbocharger as claimed in claim 1, wherein the external groove (6) is a 360° encircling groove.

3. The bearing housing as claimed in claim 1, wherein the internal groove (6') reduces the heat conducting path in the bearing housing to at most 2 mm at it's narrowest cross-section.

4. An exhaust-gas turbocharger (1) having
a turbine (2);
a compressor (3); and
a bearing housing (4) which is arranged between the turbine (2) and the compressor (3) and includes a compressor-side flange (5) which adjoins the compressor (3), wherein
the bearing housing (4) defines a heat-conducting path between the bearing housing turbine end and the compressor-side flange (5), and
a thermal decoupling heat throttle (6, 6') is arranged in the compressor-side flange (5) of the bearing housing (4) wherein the thermal decoupling heat throttle is an internal groove (6'), and wherein the internal groove (6') reduces the heat conducting path in the bearing housing to at most 3 mm at it's narrowest cross-section.

5. The exhaust-gas turbocharger as claimed in claim 4, wherein the internal groove (6') is a 360° encircling groove.

6. The exhaust-gas turbocharger as claimed in claim 4, wherein a heat insulation element (7, 8) is arranged in the internal groove (6').

7. The exhaust-gas turbocharger as claimed in claim 6, wherein the heat insulation element (8) completely fills the internal groove (6').

8. The exhaust-gas turbocharger as claimed in claim 6, wherein the heat insulation element (7; 8) is s a disk composed of heat-insulating material.

9. The exhaust-gas turbocharger as claimed in claim 8, wherein the disk is a ceramic disk.

10. The bearing housing as claimed in claim 4, wherein the internal groove (6') reduces the heat conducting path in the bearing housing to at most 2 mm at it's narrowest cross-section.

11. A bearing housing (4) of an exhaust-gas turbocharger (1), having a compressor-side flange (5) and having a turbine end, the bearing housing (4) defining a heat-conducting path between the turbine end of the bearing housing and the compressor-side flange (5), wherein a thermal decoupling heat throttle is arranged in the compressor-side flange (5), wherein the heat throttle is an internal groove (6'), wherein the internal groove (6') reduces the heat conducting path in the bearing housing to at most 3 mm at it's narrowest cross-section, wherein the groove has a height (H) and a width (B), and wherein a the ratio of height (H) to width (B) of the groove (6') is >2.5.

12. The bearing housing as claimed in claim 11, wherein the internal groove (6') is a 360° encircling groove.

13. The bearing housing as claimed in claim 11, wherein a heat insulation element (7, 8) is arranged in the internal groove (6').

14. The bearing housing as claimed in claim 13, wherein the heat insulation element (8) completely fills the internal groove (6').

15. The bearing housing as claimed in claim 13, wherein the heat insulation element (7; 8) is a disk composed of heat-insulating material.

16. The bearing housing as claimed in claim 15, wherein the disk is a ceramic disk.

17. The bearing housing as claimed in claim 11, wherein the internal groove (6') reduces the heat conducting path in the bearing housing to at most 2 mm at it's narrowest cross-section.

* * * * *